United States Patent [19]
Zahedi et al.

[11] Patent Number: 5,771,680
[45] Date of Patent: Jun. 30, 1998

[54] STIFFENED COMPOSITE STRUCTURES AND METHOD OF MAKING THEREOF

[75] Inventors: Ahmad P. Zahedi, Cincinnati; Stephen C. Mitchell, West Chester, both of Ohio

[73] Assignee: General Electric Company, Cincinnati, Ohio

[21] Appl. No.: 576,249

[22] Filed: Dec. 21, 1995

[51] Int. Cl.⁶ .................................................. F02C 2/20
[52] U.S. Cl. .......................... 60/226.1; 60/39.31; 60/909; 428/36.1; 428/36.3; 156/196
[58] Field of Search .............................. 60/226.1, 39.31, 60/909; 428/36.1, 36.3; 156/264, 265, 196

[56] References Cited

U.S. PATENT DOCUMENTS

| | | | |
|---|---|---|---|
| Re. 30,489 | 1/1981 | Abbott | 60/909 |
| 2,688,327 | 2/1954 | Steele | 156/197 |
| 2,898,940 | 8/1959 | Cole, Jr. . | |
| 3,013,315 | 1/1961 | Robinson | 156/197 |
| 3,018,205 | 1/1962 | Barut | 156/197 |
| 3,134,705 | 5/1964 | Moeller | 156/197 |
| 3,210,233 | 10/1965 | Kummer et al. | 60/909 |
| 3,257,253 | 6/1966 | Hoyt | 156/197 |
| 3,272,686 | 9/1966 | Smith et al. | 156/197 |
| 3,617,416 | 11/1971 | Kromrey | 60/909 |
| 3,693,354 | 9/1972 | Hull, Jr. . | |
| 3,757,827 | 9/1973 | Seiwert et al. . | |
| 3,793,827 | 2/1974 | Ekstedt . | |
| 4,063,847 | 12/1977 | Simmons . | |
| 4,285,194 | 8/1981 | Nash . | |
| 4,880,681 | 11/1989 | Price et al. | 428/116 |
| 4,961,685 | 10/1990 | Neubert . | |
| 4,968,546 | 11/1990 | Takahashi | 428/36.3 |
| 4,969,623 | 11/1990 | Blessing et al. | 60/909 |
| 5,038,834 | 8/1991 | Siegfried . | |
| 5,182,906 | 2/1993 | Gilchrist et al. . | |
| 5,211,007 | 5/1993 | Marvin . | |
| 5,222,360 | 6/1993 | Antuna et al. . | |
| 5,251,435 | 10/1993 | Pauley | 60/39.31 |
| 5,305,599 | 4/1994 | Marvin . | |
| 5,313,788 | 5/1994 | Wright et al. . | |
| 5,315,820 | 5/1994 | Arnold | 60/226.1 |
| 5,556,677 | 9/1996 | Quigley et al. | 428/36.3 |

Primary Examiner—Timothy Thorpe
Assistant Examiner—Ted Kim
Attorney, Agent, or Firm—Andrew C. Hess; Patrick R. Scanlon

[57] ABSTRACT

A stiffened composite is provided exhibiting multi-directional reinforcement with continuous long fibers. The composite has a substrate and serpentine stiffeners adhered thereto. The stiffeners merge toward, join with and diverge from adjacent stiffeners to provide a stiffener matrix on the substrate. The serpentine stiffener permit the matrix to exhibit multi-directional reinforcement with the continuous long fibers within the serpentine ribs. The composite structures are useful as aircraft bypass ducts, and as other composite products.

9 Claims, 4 Drawing Sheets

STIFFENED COMPOSITE STRUCTURES AND METHOD OF MAKING THEREOF

The Government has rights to this invention pursuant to Contract No. F33615-87-C-2843 awarded by the Department of the Air Force.

BACKGROUND OF THE INVENTION

1. Field of the Invention

The present invention relates to composite structures, and more particularly to stiffened composite structures and methods thereof.

2. Description of the Related Art

Various composite structures are known such as composite ducts, see, Siewert et al., U.S. Pat. No. 3,757,827, issued Sep. 1, 1973, which is incorporated herein by reference, and various stiffener arrangements for combustor liners in a gas turbine engine are known, see Ekstedt, U.S. Pat. No. 3,793,827, issued Feb. 26, 1974, which is incorporated herein by reference. Some stiffener configurations are designed to stabilize planar structural members against buckling or loads. For example, circumferential stiffeners, also referred to as rings, are placed on pressurized vessels to reduce the bulging effects and axial stiffeners are placed on a cylinder to improve bending and buckling strength.

There are cases when two or more crossing stiffeners are required to provide the stiffness necessary to support the required loads. One such case is the outer ducts in aircraft engines. These ducts, commonly referred to as bypass ducts, act as the backbone of the engine providing a means to transfer and or share internally and externally generated loads between the engine mounts. The aircraft engine bypass duct is subject to internal pressure as well as bending and axial loads. The combination of the bending and axial loads usually requires buckling strength. Buckling strength is usually provided by breaking the shell (planar member) into smaller plates whose edges are stiffened by stiffeners. Usually a two or three member stiffener pattern is used. When the stiffener pattern has two members and the members are normal to each other, the pattern is called a waffle-grid. In the case of a three member stiffener pattern where the members cross at 60 degrees and form equilateral triangles, the pattern is called an isogrid.

In weight sensitive structures, such as aircraft engines, the need to stiffen a shell or panel against bending, out of plane shear or buckling load requirements must be balanced with low profile and less weight. This is the reason that fiber reinforcement of stiffeners is desired.

Prior stiffeners have generally lacked simultaneous continuity of fiber in the load paths for more than one direction. Prior attempts to provide continuous fiber in multi-directional crossing stiffeners have generally involved either (a) only fibers in one of the stiffeners member being continuous or (b) a very laborious lay-up of plies with alternate layers of reinforced plies being fabricated which generally resulted in effectively lower fiber volume fractions.

Consequently, there is a desire to provide a composite stiffener structure for aircraft engine ducts which efficiently allows for maximum utilization of fibers in stiffeners by eliminating the need to cross the stiffeners.

SUMMARY OF THE INVENTION

The present invention involves a composite having serpentine shaped stiffeners which merge, join, and diverge in repeating fashion with adjacent stiffeners to provide multi-directional stiffeners. The serpentine shape may be in the nature of angular, waved and/or sinusoidal form forming rectangular, square, or hour glass shapes with adjacent stiffeners, and the use of long bars continuously reinforced with fibers such as titanium matrix composites, permits fiber continuity for the axial as well as circumferential load paths.

DETAILED DESCRIPTION OF THE INVENTION

A composite structure having fiber reinforced serpentine stiffeners is provided. The stiffeners merge toward, join with and then diverge from adjacent stiffeners to provide multi-directional continuous fiber reinforcements. The stiffeners provide fiber continuity for the axial and circumferential load paths.

Figure 1:
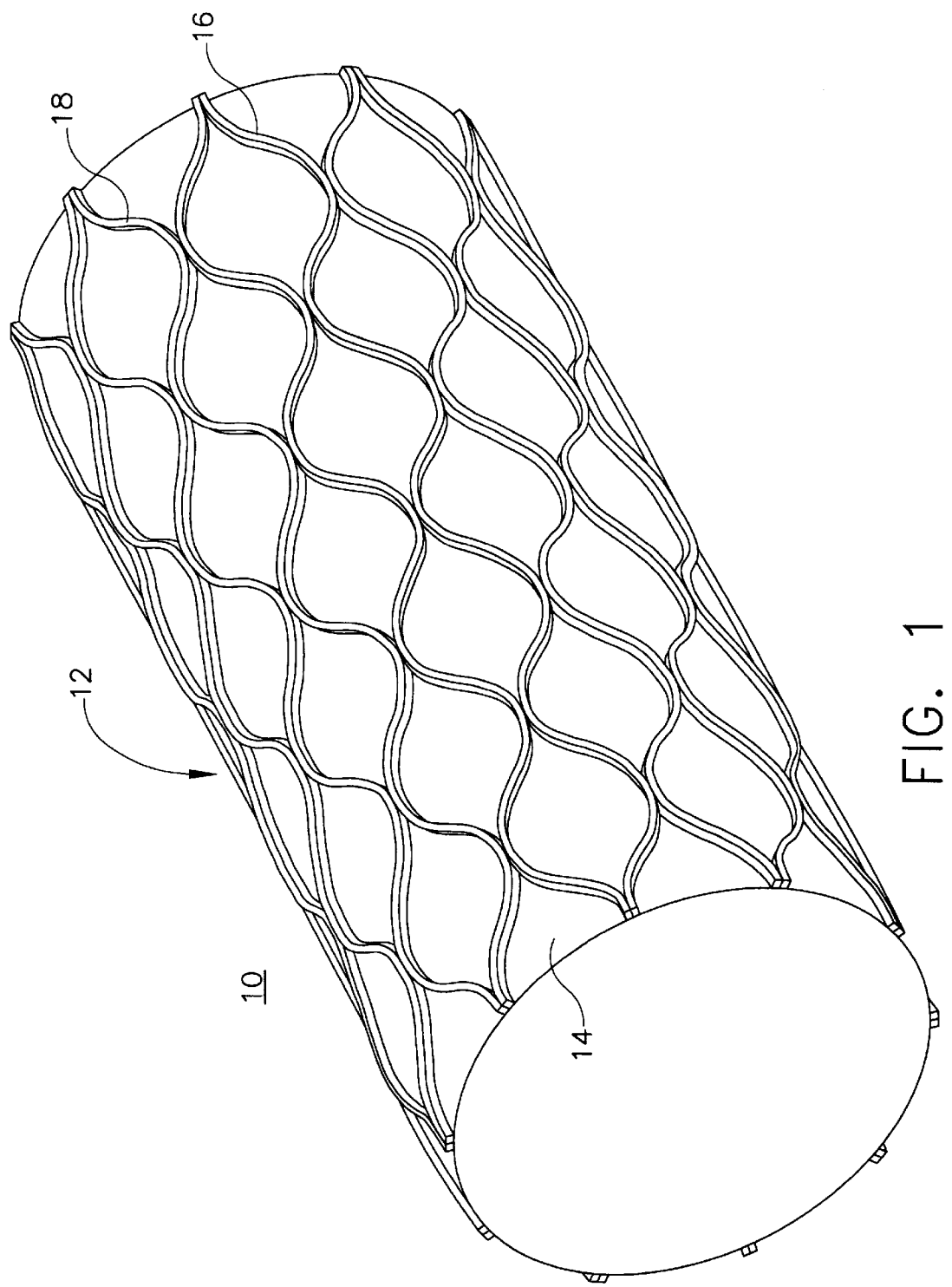
FIG. 1 is a perspective view of a stiffened composite structure according to the present invention.
Figure 2:
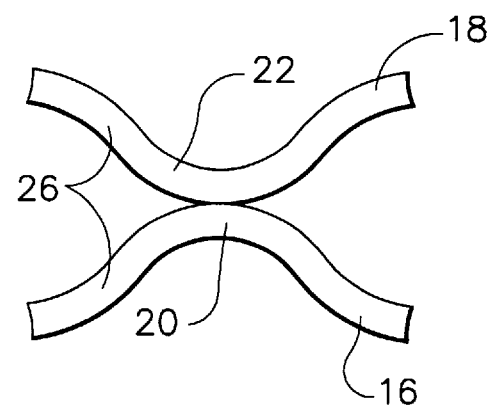
FIG. 2 is a cutaway perspective view of two adjoining stiffeners of the structure of FIG. 1.
Figure 3:
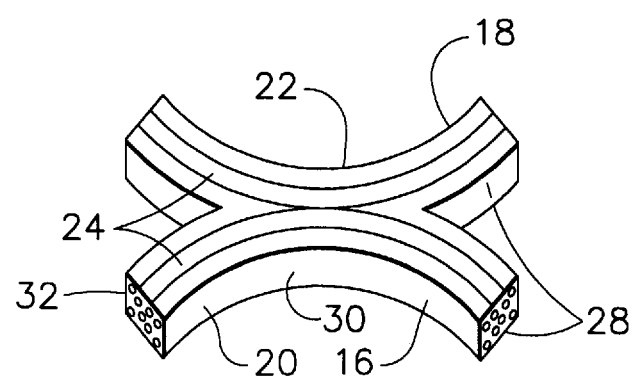
FIG. 3 is a cross-sectional top plan view of the adjoining stiffeners of FIG. 2.

The serpentine stiffeners are preferably sinusoidal in shape, being shaped like a sine curve or sine wave, as shown in FIGS. 1, 2 and 3.

As best shown in FIG. 1, the composite structure (10) comprises (a) a reinforcing matrix (12) fixedly adhered to (b) a substrate (14).

The reinforcing matrix (12) comprises a first serpentine composite stiffener (16) which merges, joins and diverges from a second stiffener (18). The stiffeners are preferably mirror images of each other. Preferably, the matrix (12) comprises a plurality of serpentine composite stiffeners (16) which merge toward, join with and diverge from adjacent stiffeners (18).

As shown in FIG. 2, the stiffeners (16) join at apex (20) thereof, with adjacent stiffener (18) at base (22) thereof. As best shown in FIG. 3, each stiffener (16, 18) has a plurality of long continuous fibers (24) running through the length thereof. The serpentine nature of the stiffeners (16, 18) allows for the creation of a matrix (12) which can provide long fiber multidirectional load dispersal.

Figure 4:
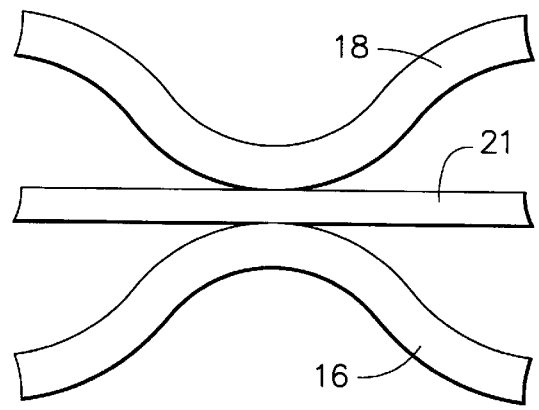
FIG. 4 is an alternative embodiment stiffener arrangement for a composite structure.
Figure 5:
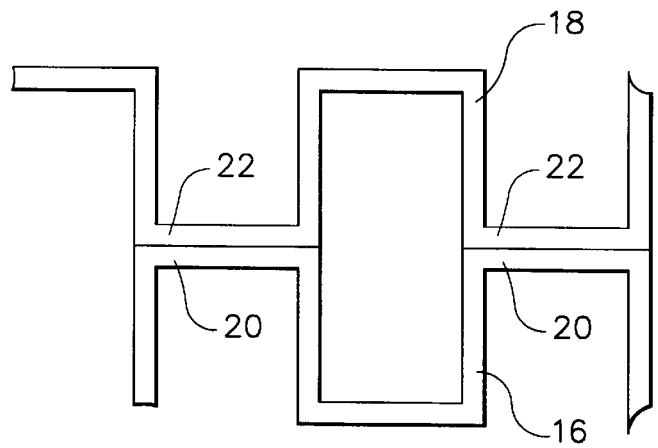
FIG. 5 is an alternative embodiment stiffener arrangement for a composite structure.
Figure 6:
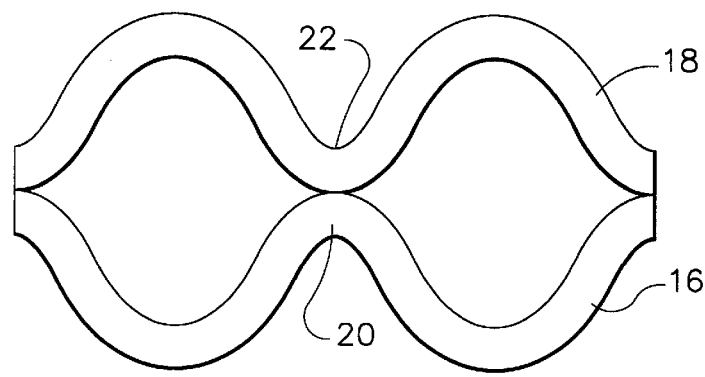
FIG. 6 is an alternative embodiment stiffener arrangement for a composite structure.

As best shown in FIG. 4, the matrix may further include a linear axial, fiber reinforced, stiffener (21) disposed between two serpentine stiffeners and joined therewith. As shown in FIG. 5, an alternative embodiment may have the serpentine shape in the form of rectangular bonds (right angle bonds) forming repeating rectangles with the adjacent stiffeners. As shown in FIGS. 2,3 and the serpentine shape may be in a form such that of an hour glass shape is formed by adjacent stiffeners. Preferably, each serpentine stiffener (16, 18) comprises a flat top (26), a flat bottom (28), a horizontally sinusoidal left side (first side) (30) extending vertically linearly from said top (26) to said bottom (28), and a sinusoidal right side (second side) (32) extending vertically linearly from said top (26) to said bottom (28) and spaced apart therefrom wherein the sides (30, 32) run in phase (in sinc) with each other provide a uniform thickness between the sides (30, 32) along the length of the stiffener. Each serpentine stiffener is positioned between two adjacent serpentine stiffeners and joins with the two adjacent serpentine stiffeners at a plurality of points.

A method is provided for making a reinforced composite structure (10), the method involves (a) preparing a serpentine composite plate (44) having a plurality of waves, (b) cutting the plate into a plurality of elongated serpentine stiffener ribs (16, 18), (c) adhering the ribs to a substrate (14), the ribs (16) longitudinally merging from, joining to, and diverging from adjacent ribs (18) to form a stiffener matrix (12) on the substrate (14).

Figure 7:
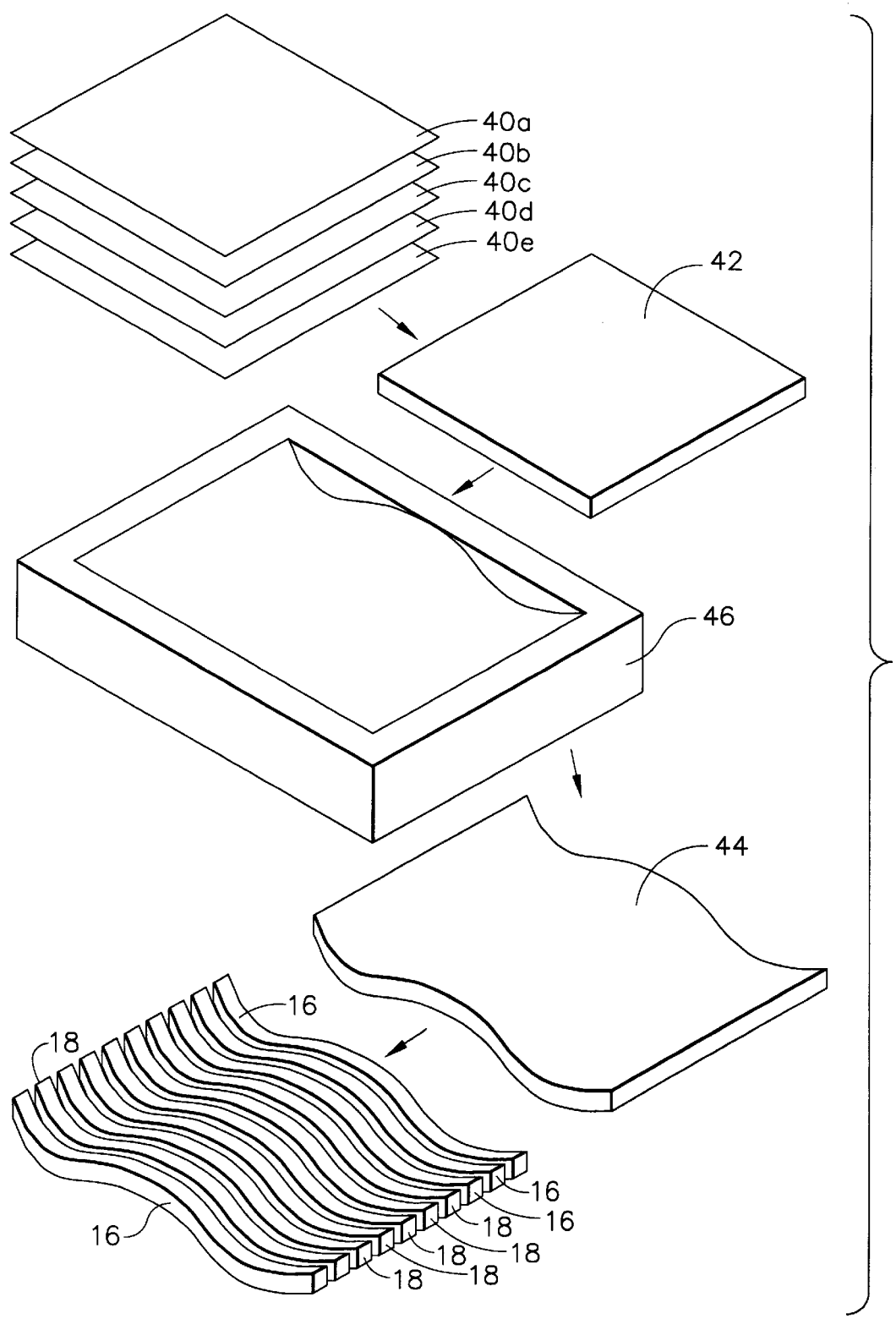
FIG. 7 is a schematic representation of a multi-step process for making the stiffeners.

In more detail, as shown in FIG. 7, the process (method) involves the steps of (a) assembly a plurality of layers (40a, b, c, d, e) wherein at least one layer comprises long fibers and at least one layer comprises a metal, and the plurality of layers may optionally be alternating layers of foil and fiber (or optionally mmc monotapes) (b) consolidation of the plurality of layers into a flat plate (42), (c) forming the flat plate into a serpentine plate (waved plate) (44) by pressure forming in matched dies (only one die shown) (46) and (d) cutting the serpentine plate transverse to the waves to make serpentine stiffeners (16, 18).

The term composite, for the purposes of this invention, denotes a material containing a fiber such as a carbonaceous, silica, metal, metal oxide, or ceramic fiber embedded in a resin material such as Epoxy, PMR-15, BMI, PEEU, and metals such as Titanium Copper, and aluminum, and ceramics such as SiC and $Al_2O_3$, of particular use are fibers woven into cloth that is impregnated with a resin and cured via an autoclaving process or press molding to form a hard relatively homogeneous article. For certain structures, the composite may be a graphite woven cloth impregnated with a PMR-15 polyimide resin, this includes tape as well as fabric. A discussion of this material may be found in an article in the January 1990 issues of Plastics Engineering, entitled "Processing of PMR-15 Prepregs for High Temperature Composites", by Mel Kaniz, which is incorporated herein by reference. Further information concerning suitable materials and definitions may be found in the "Engineering Material & Handbook" by ASM INTERNATIONAL, 1987–1989 or later editions, which is incorporated herein by reference.

We claim:
1. A composite structure comprising:
   (a) a tubular substrate, and
   (b) a plurality of stiffeners adhered to said substrate, wherein each of said stiffeners is a serpentine stiffener which longitudinally merges toward, joins with and then diverges from an adjacent stiffener, wherein each of said serpentine stiffeners comprises a plurality of reinforcing fibers extending longitudinally within said serpentine stiffener.
2. The structure of claim 1 wherein said structure is an aircraft bypass duct.
3. The structure of claim 1 wherein said substrate is a hollow cylindrical substrate.
4. The structure of claim 1 wherein said structure comprises a plurality of serpentine stiffeners wherein each serpentine stiffener longitudinally merges with, joins to and diverges from an adjacent serpentine stiffener.
5. The structure of claim 1 wherein each serpentine stiffener is positioned between two adjacent serpentine stiffeners and joins with the two adjacent serpentine stiffeners at a plurality of points.
6. The structure of claim 1 wherein said serpentine stiffener comprises a flat top, a flat bottom, a sinusoidal left side extending from said top to said bottom, and a sinusoidal right side extending from said top to said bottom and spaced apart from said left side.
7. The structure of claim 6 wherein said serpentine stiffener is substantially rectangular in crosssection transverse to top and bottom walls.
8. The structure of claim 1 wherein said fibers are wave shaped within the stiffener.
9. An aircraft engine comprising:
   (a) a bypass duct comprising:
      (i) a tubular substrate,
      (ii) a plurality of fiber reinforced serpentine stiffeners attached to said substrate, wherein each serpentine stiffener longitudinally merges toward, joins with and then diverges from an adjacent stiffener, said serpentine stiffener comprises a plurality of reinforcing fibers extending longitudinally within said serpentine stiffener, wherein each serpentine stiffener comprises a plurality of reinforcing fibers extending longitudinally within said serpentine stiffener.

* * * * *